United States Patent [19]

Leahy et al.

[11] Patent Number: 5,063,572
[45] Date of Patent: Nov. 5, 1991

[54] CHANNELIZED DELAY AND MIX CHIP RATE DETECTOR

[75] Inventors: Ronald S. Leahy; Patrick J. Smith, both of Salt Lake City, Utah

[73] Assignee: Unisys Corporation, Blue Bell, Pa.

[21] Appl. No.: 533,183

[22] Filed: Jun. 4, 1990

[51] Int. Cl.$^5$ ............................................. H04K 1/00
[52] U.S. Cl. ......................................................... 375/1
[58] Field of Search ........................... 375/1; 350/356

[56] References Cited

U.S. PATENT DOCUMENTS

| | | | |
|---|---|---|---|
| 4,199,668 | 4/1980 | Scozzari | 375/1 |
| 4,203,070 | 5/1980 | Bowles et al. | 375/1 |
| 4,203,071 | 5/1980 | Bowles et al. | 375/1 |
| 4,217,586 | 8/1980 | McGuffin | 375/1 |
| 4,222,115 | 9/1980 | Cooper et al. | 375/1 |
| 4,647,863 | 3/1987 | Skudera, Jr. et al. | 375/1 |
| 4,652,817 | 3/1987 | Yarborough et al. | 350/356 |
| 4,821,294 | 4/1989 | Thomas, Jr. | 375/1 |

Primary Examiner—Salvatore Cangialosi
Attorney, Agent, or Firm—Alfred W. Kozak; Mark T. Starr

[57] ABSTRACT

A detector circuit for indicating the chip rate of a direct sequence frequency hopped data transmission signal. The wide band input signal is channelized into L adjacent sub-bands and each sub-band signal is multiplied by a delayed copy of itself and then hard limited, after which all the hard limited product signals are totalized to give a resultant signal representative of the chip rate.

11 Claims, 2 Drawing Sheets

CHANNELIZED DELAY AND MIX CHIP RATE DETECTOR

FIELD OF THE INVENTION

This disclosure involves circuitry designed for the detection and characterization of secured data transmissions which are frequency-hopped (FH) signals.

CROSS-REFERENCES TO RELATED APPLICATIONS

This application is related to co-pending applications by the same inventors designated as U.S. Ser. No. 417,175, entitled "Channelized Binary-Level Hop Rate Detector", and U.S. Ser. No. 417,124, entitled "Channelized Binary-Level Radiometer".

BACKGROUND OF THE INVENTION

One of the developmental areas involving data transmission is the use of frequency-hopped networks which have been designed to provide for secure, reliable digital communications. These systems are generally able to maintain intelligible communication with as much as 20% of their channels jammed, and for this reason it is possible to successfully transmit data in noisy or jammed spectral regions.

Frequency-hopped radio transmissions create processing gain by utilizing a large number of independent frequency locations. For example, certain types of radio transmitters make use of up to 2,000 different hop locations. It follows that the input bandwidth, W, of a frequency-hopped signal detector is much larger than the width of the binary phase shift keying (BPSK) envelope.

Spectral analysis techniques will not always reveal the presence of hybrid FH/DS (frequency-hopping-/direct sequence) signals because of the inherent covert nature of these signals. However, certain classes of Fourth Law detectors have been shown to be useful against all types of frequency-hopped signals. The class of channelized detectors have been shown to be useful as well, owing to their selective elimination of narrowband interference sources.

The class of hybrid detectors, which combine channelizing and nonlinear combining techniques with Fourth Law Detectors, has been shown to be especially useful for frequency-hopped signal detection. These detectors utilize channelizing techniques such as those discussed in U.S. patent applications U.S. Ser. No. 417,175 entitled "Channelized Binary-Level Hop Rate Detector", and U.S. Ser. No. 417,124 entitled "Channelized Binary-Level Radiometer". These applications are related to the present disclosure and are included herein by reference. These applications are also commonly assigned to the same corporate entity, the Unisys Corporation of Blue Bell, Penn.

One of the problems in frequency-hopped data transmission detection is the determination of the "chip rate" or "data rate" of a covert frequency-hopped/direct sequence (FH/DS) signal. Very often, narrowband interference signals make this detection process difficult unless the detector is provided with considerable immunity to narrowband interference.

The present disclosure incorporates delay and mix techniques with channelizing and non-linear combining techniques to create a chip rate detector which can be used for the detection and characterization of covert frequency-hopped/direct sequence signal transmissions.

In direct sequence (DS) spread spectrum communications, for each information data bit (i), there are "N" transmitted coded bits, each coded bit called a "chip" (c), thus giving the ratio $N = R_c/R_1$. This ratio represents the factor by which the original bandwidth is spread. $R_c$ is the chip rate (coded) while $R_1$ is the information bit rate.

The coded bit (chip) rate $R_c$ is larger than the information bit rate $R_1$ since for each information bit there are N coded bits (chips) which provide the relation that $N = R_c/R_1$.

Suppose that for the transmission of an uncoded information sequence with the information bit rate of $R_1$, a bandwidth of $B_1$ is required. By increasing the bandwidth to $B_1(B_c = NB_1)$, it is possible to transmit in the extended bandwidth, a coded bit rate of $R_c = NR_1$.

In direct sequence (DS) spread spectrum communications, N coded bits are transmitted for every information data bit each time in a differently coded form. In order to distinguish it from the data bit, each of the N coded bits is known as a "chip". The coded signal is achieved by modulo-two addition of a sequence of N chips for each of the data bits. The result of this addition is a chip rate of $R_c$ is used to modulate the carrier frequency.

While the data stream depends on the information bits being transmitted, the "chip" stream is generated using a predetermined coding scheme. That is, a stream pattern of N chips is transmitted for each data bit.

The chip stream pattern of N chips per bit can take any sequence form, of "ones" and "zeroes", provided that it can be reproduced identically for each information bit, and that it is available both in the transmitter and receiver.

The advantage of frequency hop (FH) signals is twofold. First, they have a high degree of immunity to narrowband interference and can, therefore, be operated in dense interference environments.

Second, frequency hop signals are relatively covert in that the signal power is spread over a much greater bandwidth than is required by the data rate. Due to these properties, frequency hop detectors must be able to detect signals at a low signal-to-noise ratio while operating in the presence of multiple narrowband interference signals.

The present disclosure presents a hybrid FH/DS chip rate detector which, due to channelization and a unique non-linear combining technique, provides improved performance over currently known detectors and is relatively immune to the effects of narrowband interference.

Another term useful in these types of data transmissions is the concept of "hop rate". This represents the rate at which the transmitted signal carrier frequency hops from one frequency to another frequency.

There is seen in FIG. 3 a schematic drawing of a delay and mix chip rate detector. This type of detector is commonly used for generating a spectral line at the chip rate ($R_c$) of a carrier-modulated phase shift keying (PSK) signal. The PSK signal, designated as x(t), at the input of the detector, is given by equation EQ I as follows:

$$x(t) = Ae^{-jwct + \Phi(t)} \qquad \text{EQ I}$$

where A is the amplitude and $\Phi(t)$ is the piecewise constant phase of the baseband PSK signal, and $w_c$ is the carrier frequency, and $j=\sqrt{-1}$. This signal is then multiplied by the complex conjugate of a delayed copy of itself to obtain equation EQ II as follows:

$$y(t) = A^2 e^{-j[\Phi(t) - \Phi(t - T_c/2) + w_c T_c/2]} \qquad \text{EQ II}$$

where $T_c$ is the time between chips of the PSK signal.

The output, y(t), can be considered to be the sum of a random phase signal and a deterministic square wave signal.

During every other $T_c/2$ period, the phases $\Phi(t)$ and $\Phi(t - T_c/2)$ are equal and cancel each other, making y(t) equal to the complex constant of equation EQ III as follows:

$$y(t) = A^2 e^{-jw_r T_c/2} \qquad \text{EQ III}$$

During the other time periods (other than the previously mentioned phases, however, the phases $\Phi(t)$ and $\Phi(t - T_c/2)$ are random and independent, making y(t) equal to equation EQ IV, as follows:

$$y(t) = A^2 e^{-j\theta} \qquad \text{EQ IV}$$

with $\theta$ being a random phase.

The "random signal" consists of the "chips" of length $T_c/2$ and the random phase, spaced one chip-time apart.

The "deterministic signal" consists of the constant phase chips of length $T_c/2$ spaced one chip-time apart. The deterministic component is periodic with a period $T_c$ and has a strong fundamental frequency component at the time period $1/T_c$.

Therefore, spectral analysis of the output of the delay and mix detector of FIG. 3 will reveal a spectral line at the chipping rate when a PSK signal is present at the input.

In FIG. 3, the PSK signal x(t) is shown on line 10x at the input of the detector. The complex conjugate of a delayed copy of itself is provided by the circuit 14 of FIG. 3, which circuit provides its output to a multiplier unit 16 which then combines the inputs to the multiplier to form the output signal y(t) on line 18y.

In this system of FIG. 3, the carrier of the PSK signal remains constant. However, in "hybrid" FH/DS (frequency-hopped/direct sequence) systems, the carrier of the PSK signal is hopped over a multitude of frequencies. Thus a "delay and mix" detector with an input bandwidth equal to the direct sequence (DS) bandwidth may be used on such signals. However, the probability of intercept will be inversely proportional to the processing gain of the frequency-hopped system and the detector performance may be unacceptable.

There are other delay and mix detectors, such as the MODAC, which operate on the entire hop bandwidth. The MODAC was developed by the Pacific Sierra Research Company located in Los Angeles, California. However, these types of detectors are vulnerable to the narrowband interference often accompanying frequency-hopped (FH) signals.

The present disclosure which involves a "channelized" delay and mix detector (CDMD) also operates on the entire hop bandwidth but reduces the effects of narrowband interference by "channelizing" the signal and performing a parallel set of delay and mix detectors as will be discussed in connection with FIG. 2 and 3 hereinafter.

SUMMARY OF THE INVENTION

This application describes a channelized frequency-hopped/direct sequence delay and mix chip rate detector. It uses a filter bank to perform a parallel set of delay and mix chip rate detectors. The parallel delay and mix signals are non-linearly combined in order to optimize detector performance and to eliminate effects of narrowband interference. The input signal is channelized as well as a delayed version of the input, and then the filtered signals are multiplied channel by channel. The products are passed through a non-linearity circuit before combining by a summation circuit. Fourier processing is then used to determine the presence of a chip rate line.

The channelization and the non-linear combination of the channels are used to improve the performance of the detector with respect to wideband techniques. They also allow the delay and mix chip rate detector to be used on hybrid frequency-hopped/direct sequence signals, by performing delay and mix processing on the entire hop bandwidth.

DESCRIPTION OF PREFERRED EMBODIMENT

Figure 2:
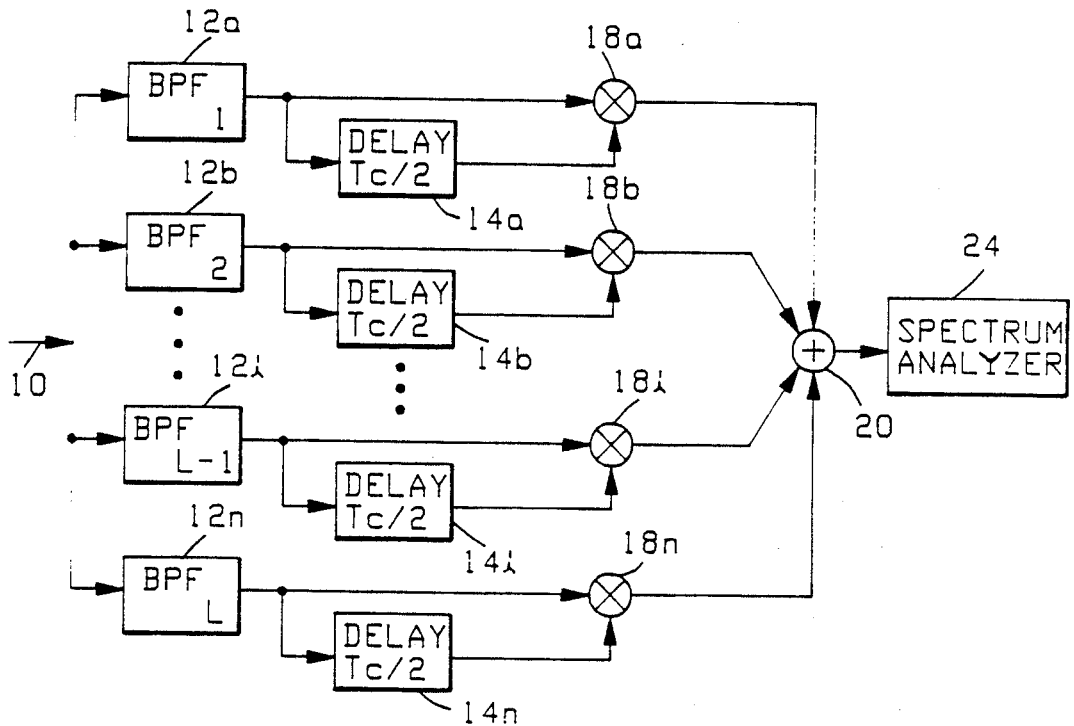
FIG. 2 is a block diagram of a parallel delay and mix detector using channelization.

Shown in FIG. 2 is a block diagram of the channelized delay and mix detector (CDMD). The input signal 10, containing the entire hop bandwidth, W, is channelized by a set of L contiguous complex bandpass filters, $12_a$, $12_b$, $12_1$ and $12_n$. Each filter has a bandwidth of W/L, which is assumed to be greater than the direct sequence (DS) bandwidth of the hop signal. Each filter is followed by a delay and mix detector, $14_a$, $14_b$, $14_1$, $14_n$, with the delay approximately equal to one-half the direct sequence (DS) chip rate.

A series of multipliers, $18_a$, $18_b$, $18_1$, $18_n$, multiply the inputs which have been received from the bandpass filters 12 and the delay and mix detectors 14. The outputs of the multipliers 18 are all fed to a Summing circuit 20 to form an output signal which is sent to the spectrum analyzer 24 in order to determine the direct sequence chip rate.

Figure 3:
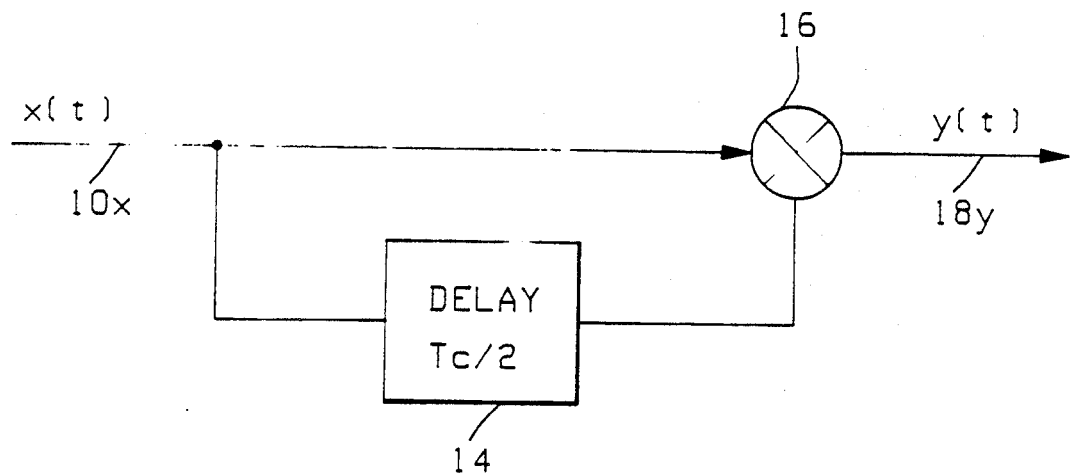
FIG. 3 is a schematic drawing of a delay and mix chip rate detector commonly used for generating a spectral line at the chip rate of a carrier-modulated phase shift keying signal.
Figure 4:
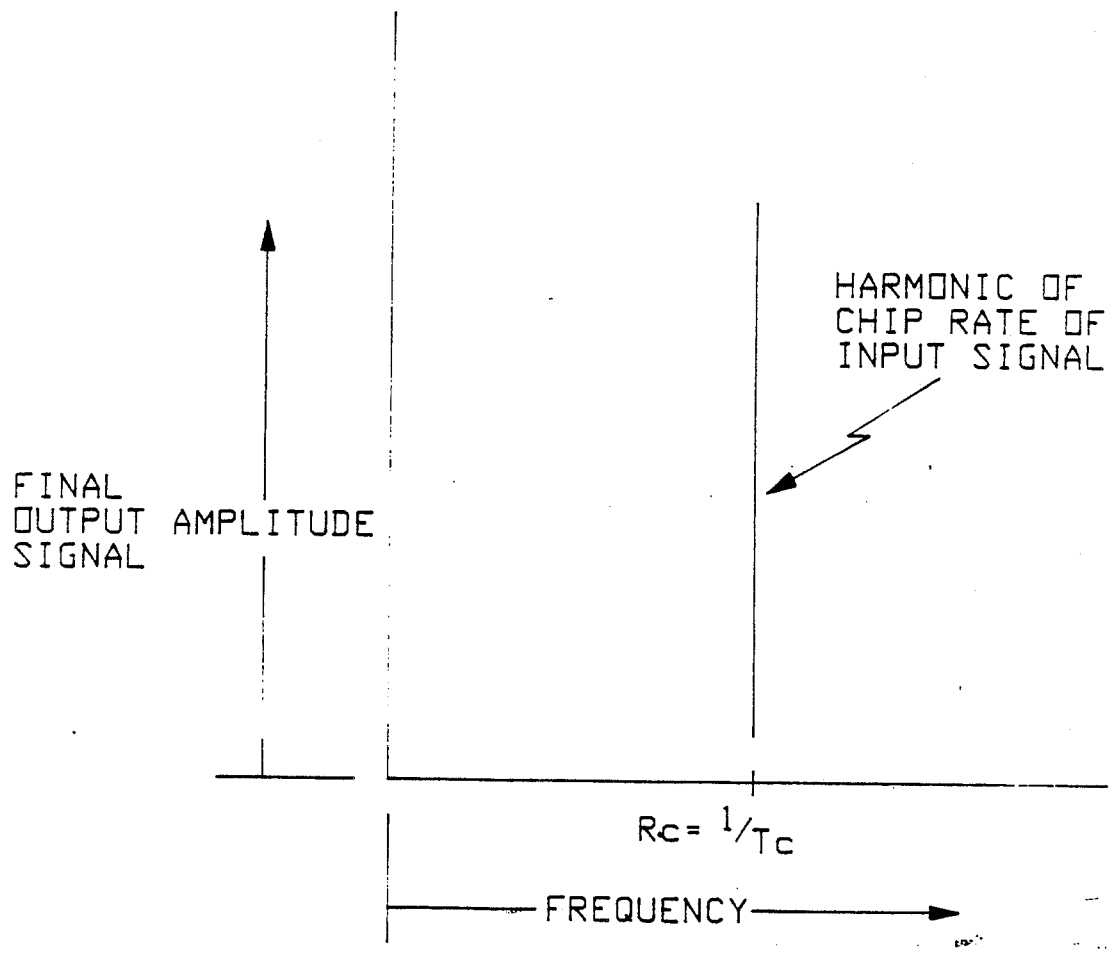
FIG. 4 is a graph showing the relationship of output signal amplitude over and against the frequency in order to generate a spectral line at the chip rate of a carrier-modulated PSK signal.

In data communication, the modulated signal Y(t) (FIG. 3) is directly related to the information rate $R_1 = 1/T_i$ where $T_i$ is the basic clock timing. In spread spectrum communications, the modulated signal Y(t) is related to the coded source with a rate of $R_c = 1/T_c$ with $R_c$ being greater than $R_1$.

Since for each information data bit there are N transmitted chips, this gives the ratio of $N = R_c/R_1$. This ratio also represents the factor by which the original bandwidth is spread, namely $N = B_1/B_c$, where $R_c$ is the chip rate and $R_1$ is the information rate; and where $B_1$ is the information bandwidth while $B_c$ is the chip bandwidth.

While the data stream depends upon the information content being transmitted, the chip stream is generated using a predetermined coding scheme. That is to say, a stream pattern of N chips is generated for every chip, thus N can be regarded as the number of sequence chips per information bit. The modulo-two addition of the data stream and the chip stream has the advantage of producing a signal representing the original data. However, the bandwidth of this signal is N times the bandwidth of the original signal. Thus the data stream of rate $R_1$ is added to the chip stream of rate $R_c$ to provide a coded stream, Rs.

In FIG. 2, due to the hopping of the direct sequence (DS) carrier, the spectral line at the output of the channelized delay and mix detector (CDMD) is spread by the hop rate.

Thus, letting $w_1$ denote the carrier frequency during the ith hop, the constant phase of the square wave signal becomes, per equation EQ V, as follows:

$$\text{constant phase} = A^2 e^{-jw_i T_c/2} \qquad \text{EQ V}$$

Since $w_1$ changes frequency for each hop made, it is seen that the square wave signal becomes phase modulated with phase transitions occurring at the hop rate. The effect of this modulation is that the harmonic frequencies of the periodic signal are spread to have band widths on the order of the hop rate, $R_h$.

In most cases, however, the "hop rate" $R_h$ is much less than the "chip rate" ($R_c$) and spectral analysis may still be used to determine the chip rate of the signal.

The designation $T_c$ represents the duration of a single chip. $R_c = 1/T_c$ where $T_c$ is the time duration of one chip.

Figure 1:
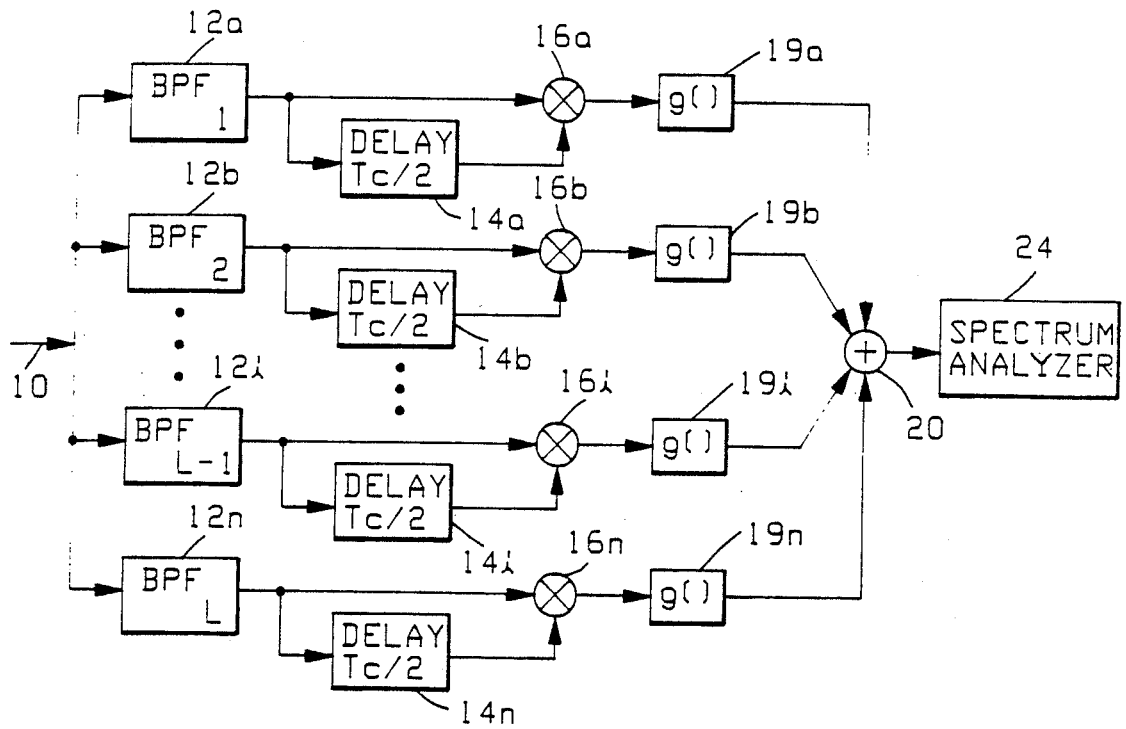
FIG. 1 is a block diagram of a generalized delay and mix detector.

Now referring to FIG. 1, there is seen a block diagram of a generalized delay and mix chip rate detector. This can be designated as GDMD.

In order to increase the detector power, the GDMD, FIG. 1, generalizes the CDMD of FIG. 2, by passing the outputs of the delay and mix circuits through a general non-linearity circuit 19 ($19_a$, $19_b$, $19_1$, $19_n$) before combining the channels by summation using the summing circuit 20. The non-linearity circuitry, g(—) of blocks 19, acts on the magnitude of the complex signal. The optimal generalized delay and mix detector (GDMD) is then achieved by maximizing the detector performance with respect to the non-linearity g(—) of circuit 19.

Thus, in FIG. 1, the input signal 10 is fed through a series of channelized bandpass filters 12, each of which presents a delayed copy of the output of the bandpass filter to a complex conjugate multiplier 16. The output of the nonlinearity circuits g(—) 19 and the entire group of outputs are summed up in a summing circuit 20 which provides its output to the spectrum analyzer 24 which can be used to display the frequency content of the output sum on a screen. The rate of chip generation, that is the chip rate $R_c = 1/T_c$ appears as a spectral line. $T_c$ is the time period devoted to each chip unit of the apportioned data signal.

While it is not easily possible to determine the optimal non-linearity for the g(—) circuitry 19 (threshold detectors $19_a$, $19_b$, $19_1$, $19_n$, FIG. 1) for this detector, it is useful to note that other detectors can provide a good approximation which permits equation EQ VI to be considered a valuable and usefully good approximation for the non-linearity circuitry 19. This approximation is shown in EQ VI as follows:

$$g(y) = u(y - L_{th}) \qquad \text{EQ VI}$$

where u(—) is the unit step function and $L_{th}$ is a constant threshold value. Thus the non-linearity required is reduced to a simple comparison to a threshold value. If the threshold is crossed, the output is one. Otherwise, the output is zero. The threshold is determined by maximizing the detector performance with respect to $L_{th}$. The above represents a process called "hard limiting" whereby a signal, with many possible amplitude values, is turned into a signal with only two possible values which are either "0" or "1".

With this type of channelized detector, it is predictable that detector power will be an increasing function of the number of channels L, as long as the bandwidth of a single channel is larger than the BPSK envelope width. For large values of L, which is possible for frequency-hopped signals with large processing gains, the improvement may be deemed quite significant.

Due to the hard limiting effect of the threshold detector 19, g(—), it is expected that the BLDMD (binary level delay and mix detector) will be relatively immune to the effects of narrowband interference. When a narrowband interference signal is present in one of the channels, the delay and mix detector will produce a relatively high power "erroneous" signal in that particular channel. However, the threshold detector 19 will limit the magnitude of this erroneous signal to be "0" or "1". Therefore, the power in any one channel is limited to that of the power of the other channels. Thus for a large value of L (number of channels), the effects, of any one particular channel containing an interference signal, are greatly minimized.

| GLOSSARY LIST | |
|---|---|
| 1. HOP LOCATION: | One of several possible carrier frequencies the hop signal may be modulated with. |
| 2. FREQUENCY LOCATION: | Same as Hop Location. |
| 3. FOURTH LAW DETECTOR: | Detectors which perform two (2) squaring operations on the signal during processing. |
| 4. HYBRID FH/DS SIGNAL: | Signals which utilize both Direct Sequence (DS) modulation and Frequency Hopping (FH) to increase covertness and for resistance to jamming. |
| 5. NON-HYBRID FH SIGNAL: | Signals which utilize Frequency Hopping but do not Direct Sequence-modulate the carrier. |
| 6. CHIPS (CODED UNIT): | The basic unit of the code used to modulate the information bits. |
| 7. CHIP RATE: | The rate at which chips are transmitted and denoted as $R_c$. |
| 8. HYBRID FH/DS CHIP DETECTOR: | A detector which is capable of detecting the presence of, or determining a parameter of, hybrid FH/DS signals. |
| 9. HOP RATE ($R_h$): | The rate at which the carrier frequency is switched or "hopped". |

-continued
GLOSSARY LIST

| | | |
|---|---|---|
| 10. | PIECE WISE CONSTANT PHASE (OF BASE BAND SIGNAL): | A carrier phase which remains constant over pieces or sections of time and only changes instantly at certain points in time. |
| 11. | RANDOM PHASE SIGNAL: | A signal which has a phase that can only be described statistically. |
| 12. | DETERMINISTIC SQUARE WAVE SIGNAL: | A binary signal of alternating plus and minus bits where the period, the phase, and the amplitude are known. |
| 13. | $T_c$ | This is the time period between chips where $T_c = 1/R_c$, where $R_c$ = chip rate. It is the time period allowed for each chip of the coded signal. |
| 14. | FOURIER PROCESSING: | The processing of a signal using one of the mathematical Fourier Transforms or their equivalent. |
| 15. | NON-LINEAR COMBINING: | The combining of the multiple signals where the signals have a non-linear operation performed on them before or during the combining process. |
| 16. | CHIP RATE DETECTOR: | A detector which is capable of determining the chip rate ($R_c$) of a Direct Sequence modulated signal. |
| 17. | CHIP RATE OUTPUT DISPLAY: | This is a graph of amplitude vs. frequency of the detector output. When the DS signal is present, the graph contains an emphasized line at the chip rate. |
| 18. | DIRECT SEQUENCE BANDWIDTH: | The spectral bandwidth content of a Direct Sequence signal. This is usually considered to be approximately $2/T_c$. |
| 19. | $T_f$ | Basic clock timing rate which is the time period between clock pulses. |
| 20. | $R_c$ = CHIP RATE (CODED): | This is the rate at which coded chips are sent, denoted in chips per second. $R_c = 1/T_c$. |
| 21. | $R_f$ | Information transmittal rate in bits per second. This is the rate at which information bits are sent, in bits per second. |
| 22. | CODED SOURCE: | This is the source unit at which the coded bits are generated. |
| 23. | $B_I$ = INFORMATION BANDWIDTH: | This is the spectral bandwidth of the information signal. |
| 24. | $B_c$ = CHIP BANDWIDTH: | This is the spectral bandwidth of the coded signal. |
| 25. | N: | The number of coded bits (chips) for each data bit. |
| 26. | CHIP STREAM: | This denotes the sequence of coding chips. |
| 27. | DATA STREAM: | This denotes the sequence of data bits. |
| 28. | DIRECT SEQUENCE (DS): | This is the modulo two addition of the information bits with the coded chips. |
| 29. | SPECTRAL LINE SPREAD BY THE HOP RATE: | When a sinusoid is modulated, it has a bandwidth equal to twice the modulation rate. |
| 30. | $w_c$: | This is the carrier frequency which is used by the transmitter to transmit the original signal. |
| 31. | $w_f$ | This represents the carrier frequency that is used to modulate the data during the $i^{th}$ hop of the FH signal. |
| 32. | PERIODIC SIGNAL: | A signal which repeats itself after a given length of time. |
| 33. | u (__): | This is the unit step function which is represented as $u(x) = \begin{cases} 0 \text{ if } x < 0 \\ 1 \text{ if } x \geq 0 \end{cases}$ |
| 34. | $L_{th}$: | Is the threshold value that a signal is compared to in order to determine if the signal is greater than the threshold value. |
| 35. | BLDMD: | Is the binary level delay and mix detector which is a detector that implements a specially developed Binary Level Delay and Mix Algorithm or its equivalent. |

Presented herein has been a channelized frequency-hopping/direct sequence delay and mix chip rate detector that uses non-linear combining of the channels for improved performance. A binary level approximation to the optimal detector preserves the improved performance. And since the performance of these detectors is a function of the number of channels, improvement occurs as the number of channels is increased. Thus, the delay and mix chip rate detector described herein will effectively reduce any narrowband interference signals present while at the same time providing a spectral signal which detects and can display the chip rate of a carrier-modulated phase shift keying signal.

While other implementations may be used similar to the concepts described herein, it should be understood that the near optimum chip rate detection system provided herein is defined by the following claims.

What is claimed is:

1. A chip rate detector for detection of the chip rate of coded bits of a direct sequence frequency hopped input signal comprising:
    (a) channelizing means having sections for splitting said input signal for transmission into L separate sub-bands of frequency ranges;
    (b) delay means, in each sub-band of said channelizing means for delaying said sub-band signal by a fixed constant to obtain a delayed sub-band signal;
    (c) mixing means for multiplying said delayed sub-band signal with said sub-band signal to provide a sub-band product signal;
    (d) summation means for totalizing the sum of each sub-band product signal to generate a final output chip rate signal.

2. The detector of claim 1 wherein said mixing means includes:
    (a) threshold means for applying a pre-set limit to each one of said sub-band product signals.

3. The detector of claim 1 which includes:
(a) spectral analysis means using said final output signal to generate a display of the chip rate frequency component detected.

4. A chip rate detector apparatus comprising:
(a) means for channelizing a direct sequence frequency hopped input signal into L separate sub-bands to provide diminished bandwidth signals for each separate sub-band wherein each one of said L sub-bands includes:
   (a1) delay and mix detector means for providing a copy of said sub-band signal, which has been delayed by approximately one-half the direct sequence chip dwell period, to a multiplier means;
   (a2) said multiplier means for multiplying said delayed sub band signal by the original sub-band signal to develop a product output signal;
(b) summation circuit means for summing the product output signals from each of said L sub-bands and including:
   (b1) a final output signal with a frequency component corresponding to the chip rate of said direct sequence frequency hopped input signal.

5. The apparatus of claim 4 which includes:
(a) spectrum analyzer means for displaying the said chip rate frequency component for visual observation.

6. A chip rate detector for direct sequence frequency hopped data transmission signals operating over a selected bandwidth comprising:
(a) means for receiving said data transmission as an input signal having a chip rate of $R_c$;
(b) means for separating said input signal into L sub-bands to provide L independent signals;
(c) means for delaying each of said L independent signals by approximately one-half of the direct sequence dwell time, $T_c$, and multiplying each delayed independent signal by its corresponding original signal to generate a sub-band product signal;
(d) threshold limiting means for applying a preset limit to each of said sub-band product signals;
(e) summation means for totaling all of said L sub-band product signals to develop a final output signal containing a harmonic at the chip rate $R_c$ of the said original input signal.

7. The detector of claim 6 wherein said means for separating said input signal includes:
(a) a plurality of L band pass filters where each filter operates to pass a limited portion W/L of the bandwidth W, where W is the overall bandwidth of the frequency hopped input signal.

8. The detector of claim 6 wherein said means for delaying includes:
(a) adjustable delay-line circuit means.

9. The detector of claim 6 wherein said threshold limiting means is provided with a pre-set limiting value of $L_{th}$ for each sub-band signal so as to limit the influence of any unwanted interference signals occurring in that sub-band.

10. A chip rate detector for indicating the chip rate $R_c$ of a direct sequence frequency hopped input signal comprising:
(a) means for channelizing said input signal into sectionalized bandwidth signals;
(b) means for delaying, for a pre-set delay time, each of said sectionalized bandwidth signals;
(c) means for multiplying each said original sectionalized bandwidth signal by said delayed sectionalized bandwidth signal to generate a sectionalized bandwidth product signal;
(d) means for limiting each of said sectionalized bandwidth product signals by quantizing to a binary level value;
(e) means for totalizing the sum of all of said limited and sectionalized bandwidth product signals to generate a final output result signal representative of said chip rate, $R_c$.

11. A chip rate ($R_c$) detector for direct sequence frequency hopped input signals comprising:
(a) means for channelizing said input signal into L sub-bands of width W/L where W is the input signal bandwidth and L is the number of sub-bands;
(b) means for delaying each sub-band signal by $T_c/2$ and multiplying said delayed signal by the original sub-band signal to develop a sub-band product signal;
(c) means for limiting the amplitude of each sub-band product signal with a predetermined threshold;
(d) means to add all of said sub-band product signals to generate a final result signal which indicates the chip rate, $R_c$.

* * * * *